US011770852B2

(12) United States Patent
Koorapaty et al.

(10) Patent No.: US 11,770,852 B2
(45) Date of Patent: *Sep. 26, 2023

(54) SCHEDULING MULTIPLE SUBFRAMES IN UNLICENSED SPECTRUM

(71) Applicant: Telefonaktiebolaget LM Ericsson (publ), Stockholm (SE)

(72) Inventors: Havish Koorapaty, Saratoga, CA (US); Jung-Fu Cheng, Fremont, CA (US); Sorour Falahati, Stockholm (SE); Amitav Mukherjee, Fremont, CA (US)

(73) Assignee: Withrow & Terranova, PLLC, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,540

(22) Filed: Sep. 20, 2022

(65) Prior Publication Data
US 2023/0013630 A1    Jan. 19, 2023

Related U.S. Application Data

(63) Continuation of application No. 17/111,247, filed on Dec. 3, 2020, now Pat. No. 11,470,641, which is a (Continued)

(51) Int. Cl.
*H04W 4/00*      (2018.01)
*H04W 74/08*     (2009.01)
(Continued)

(52) U.S. Cl.
CPC ....... *H04W 74/0808* (2013.01); *H04W 72/23* (2023.01); *H04W 74/0891* (2013.01); *H04W 72/0446* (2013.01)

(58) Field of Classification Search
CPC ......... H04W 74/0808; H04W 72/1289; H04W 74/0891; H04W 72/042; H04W 72/0446
(Continued)

(56) References Cited

U.S. PATENT DOCUMENTS 10,880,922 B2 * 12/2020 Koorapaty .......... H04W 74/006
11,470,641 B2 * 10/2022 Koorapaty ........ H04W 74/0891
(Continued)

FOREIGN PATENT DOCUMENTS

CN      103688480 A      3/2014
CN      105208663 A      12/2015
(Continued)

OTHER PUBLICATIONS

3GPP TS 36.211, V11.4.0, 3rd Generation Partnership Project; Technical Specification Group Radio Access Network Evolved Universal Terrestrial Radio Access (E-UTRA); Physical Channels and Modulation, Release 11, Sep. 2013.
(Continued)

*Primary Examiner* — Chuong T Ho
(74) *Attorney, Agent, or Firm* — Withrow & Terranova, PLLC

(57) ABSTRACT

According to some embodiments, a method for use in a user equipment (UE) of transmitting uplink data in unlicensed spectrum comprises receiving, from a network node, an uplink grant comprising an indication of one or more subframes to use for transmitting uplink data. Each subframe comprises a plurality of symbols. The method further comprises obtaining an indication of a listen-before-talk (LBT) type. The LBT type indicates a type of LBT procedure that the UE should perform before transmitting uplink data. The method further comprises determining, using the obtained LBT type, at least one of a starting symbol and a stopping symbol for transmitting uplink data, and transmitting uplink data according to at least one of the determined starting symbol and the determined stopping symbol.

12 Claims, 14 Drawing Sheets

Related U.S. Application Data continuation of application No. 16/099,155, filed as application No. PCT/IB2017/052947 on May 18, 2017, now Pat. No. 10,880,922.

(60) Provisional application No. 62/339,667, filed on May 20, 2016.

(51) Int. Cl.
*H04W 72/23* (2023.01)
*H04W 72/0446* (2023.01)

(58) Field of Classification Search
USPC ........................................ 370/329, 330, 328
See application file for complete search history.

(56) References Cited

U.S. PATENT DOCUMENTS

| | | |
|---|---|---|
| 2014/0376422 A1 | 12/2014 | Dai et al. |
| 2016/0127098 A1 | 5/2016 | Ng et al. |
| 2016/0135181 A1 | 5/2016 | Nogami et al. |
| 2016/0143014 A1 | 5/2016 | Mukherjee et al. |
| 2017/0135128 A1 | 5/2017 | Yerramalli et al. |
| 2017/0223635 A1 | 8/2017 | Dinan |
| 2017/0223677 A1 | 8/2017 | Dinan et al. |
| 2017/0238342 A1 | 8/2017 | Yang et al. |
| 2017/0280475 A1 | 9/2017 | Yerramalli et al. |
| 2017/0332395 A1 | 11/2017 | Yin et al. |
| 2017/0359808 A1 | 12/2017 | Dinan |
| 2018/0049241 A1 | 2/2018 | Heo et al. |
| 2018/0270860 A1 | 9/2018 | Bhorkar et al. |
| 2018/0288805 A1 | 10/2018 | Bhorkar et al. |
| 2019/0053222 A1 | 2/2019 | Bhorkar et al. |
| 2019/0075592 A1 | 3/2019 | Li et al. |
| 2019/0150170 A1 | 5/2019 | Park et al. |
| 2019/0159253 A1 | 5/2019 | Koorapaty et al. |
| 2019/0342915 A1* | 11/2019 | Kim ..................... H04W 72/20 |
| 2020/0280465 A1* | 9/2020 | Kim ..................... H04L 25/0226 |
| 2020/0314871 A1 | 10/2020 | Sun et al. |

FOREIGN PATENT DOCUMENTS

| | | |
|---|---|---|
| CN | 105338568 A | 2/2016 |
| KR | 20150011373 A | 1/2015 |
| WO | 2016048227 A2 | 3/2016 |
| WO | 2016071763 A1 | 5/2016 |
| WO | 2016072917 A2 | 5/2016 |

OTHER PUBLICATIONS

3GPP TS 36.213, V11.4.0, 3rd Generation Partnership Project; Technical Specification Group Radio Access Network Evolved Universal Terrestrial Radio Access (E-UTRA); Physical layer procedures, Release 11, Sep. 2013.
3GPP TS 36.331, V11.5.0, 3rd Generation Partnership Project; Technical Specification Group Radio Access Network Evolved Universal Terrestrial Radio Access (E-UTRA); Radio Resource Control (RRC), Release 11, Sep. 2013.
Ericsson, "Multi-subframe scheduling design for Enhanced LAA", 3GPP TSG RAN WG1 Meeting #85, R1-165142, May 23-27, 2016.
Ericsson, "R1-165155: On Channel Access Procedures for Transmissions with Only UL Grants," 3GPP TSG-RAN WG1#85, May 23-27, 2016, Nanjing, China, 3 pages.
Ericsson, "On Signaling of UL Channel Access Parameters", 3GPP TSG RAN WG1 Meeting #64bis, R1-163152, Apr. 11-15, 2016.
Ericsson, "R1-165156: On Support of Conditional UL Transmission without LBT," 3GPP TSG-RAN WG1#85, May 23-27, 2016, Nanjing, China, 6 pages.
Huawei et al., "UL category 4 LBT with eNB assistance", 3GPP TSG RAN WG1 Meeting #85, R1-164072, May 23-27, 2016.
Sequans Communications, "Considerations for LAA UL LBT", 3GPP TSG RAN WG1 Meeting #85, R1-164318, May 23-27, 2016.
Examination Report for Indian Patent Application No. 201837044228, dated Jul. 10, 2020, 7 pages.
Notification of Reason for Refusal for Korean Patent Application No. 10-2018-7037085, dated Jan. 15, 2020, 13 pages.
Notification of Reason for Refusal for Korean Patent Application No. 10-2020-7029507, dated Nov. 4, 2020, 6 pages.
Intention to Grant for European Patent Application No. 17726377.9, dated Oct. 1, 2020, 5 pages.
International Search Report and Written Opinion for International Patent Application No. PCT/IB2017/052947, dated Aug. 31, 2017, 29 pages.
Notice of Allowance for U.S. Appl. No. 16/099,155, dated Aug. 26, 2020, 9 pages.
Non-Final Office Action for U.S. Appl. No. 16/099,155, dated Apr. 1, 2020, 14 pages.
Huawei, et al., "R1-164071: Discussion on the application of LBT options in eLAA," 3GPP TSG RAN WG1 85 Meeting, May 23-27, 2016, Nanjing, China, 4 pages.
Samsung, "R1-164753: Remaining details on Cat 4 LBT for eLAA," 3GPP TSG RAN WG1 Meeting #85, May 23-27, 2016, Nanjing, China, 4 pages.
First Office Action for Chinese Patent Application No. 201780030791. 4, dated Oct. 8, 2021, 20 pages.
Extended European Search Report for European Patent Application No. 20215509.9, dated Apr. 13, 2021, 15 pages.
Grant of Patent for Korean Patent Application No. 10-2020-7029507, dated Jun. 30, 2021, 4 pages.
Non-Final Office Action for U.S. Appl. No. 17/111,247, dated Jan. 6, 2022, 14 pages.
Notice of Allowance for U.S. Appl. No. 17/111,247, dated May 25, 2022, 8 pages.

\* cited by examiner

SCHEDULING MULTIPLE SUBFRAMES IN UNLICENSED SPECTRUM

RELATED APPLICATIONS

This application is a continuation of U.S. patent application Ser. No. 17/111,247, filed on Dec. 3, 2020, now U.S. Pat. No. 11,470,641, which is a continuation of U.S. patent application Ser. No. 16/099,155, filed on Nov. 5, 2018, now U.S. Pat. No. 10,880,922, which is a 35 U.S.C. § 371 national phase filing of International Application No. PCT/IB2017/052947, filed May 18, 2017, which claims the benefit of U.S. Provisional Application No. 62/339,667, filed May 20, 2016, the disclosures of which are incorporated herein by reference in their entireties.

TECHNICAL FIELD

Particular embodiments are directed to wireless communications and, more particularly, to methods and apparatus for scheduling multiple subframes in unlicensed spectrum.

INTRODUCTION

The Third Generation Partnership Project (3GPP) initiative referred to as License Assisted Access (LAA) enables long term evolution (LTE) equipment to operate in the unlicensed 5 GHz radio spectrum. The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

The standalone LTE-U forum and 3GPP Rel-14 work item on Uplink Licensed-Assisted Access (LAA) may specify that LTE user equipments (UEs) may transmit on the uplink in the unlicensed 5 GHz or license-shared 3.5 GHz radio spectrum. For the case of standalone LTE-U, all downlink and uplink transmissions take place entirely on the unlicensed spectrum.

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission medium for a pre-defined minimum amount of time and backing off if the channel is busy.

Wi-Fi, LAA and Standalone LTE-U may operate in multi-carrier mode with simultaneous transmission across multiple unlicensed channels in the 5 GHz band. Wi-Fi follows a hierarchical multi-carrier LBT scheme across multiple carriers which are selected using specific channel bonding rules.

For LAA and Standalone LTE-U, uplink transmissions are explicitly scheduled by the eNB which has full control over when UEs are allowed to transmit. However, for carriers operating in unlicensed spectrum, UEs perform some form of LBT before transmitting on the carrier. The form of LBT may depend on the number of UEs that are scheduled, the number of subframes that are scheduled in succession, the length of the previous transmissions on the carrier and other such factors. It is known that some parameters related to LBT can be signaled by the eNB to UEs so that they may perform LBT before transmission. However, the known signaling parameters do not fully encompass all the use cases and problems that will be encountered for uplink transmissions in unlicensed spectrum. In the embodiments described herein, we disclose more signaling methods to solve these problems and address the new use cases. In addition, the embodiments described herein describe how some signaling parameters can be used to increase efficiency of LTE in unlicensed spectrum.

As background, LTE uses OFDM in the downlink and Discrete Fourier Transform (DFT)-spread OFDM (also referred to as single-carrier FDMA) in the uplink. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. An uplink subframe has the same subcarrier spacing as the downlink and the same number of SC-FDMA symbols in the time domain as OFDM symbols in the downlink. In the time domain, LTE downlink transmissions are organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 µs.

Resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled. In each subframe a base station transmits control information about which terminals data is transmitted to and upon which resource blocks the data is transmitted in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information.

FIG. 3 illustrates an example downlink subframe. The subframe includes reference symbols and control signaling. In the illustrated example, the control region includes 3 OFDM symbols (i.e., CFI=3). The reference symbols include cell specific reference symbols (CRS), which may support multiple functions including fine time and frequency synchronization and channel estimation for certain transmission modes.

For LTE Rel-8 to Rel-10, a base station schedules downlink transmissions using a Physical Downlink Control Channel (PDCCH). From LTE Rel-11 and onwards, downlink transmissions may also be scheduled on an Enhanced Physical Downlink Control Channel (EPDCCH).

The PDCCH/EPDCCH carries downlink control information (DCI) such as scheduling decisions and power-control commands. For example, the DCI includes downlink scheduling assignments such as Physical Downlink Shared Channel (PDSCH) resource indication, transport format, hybrid-ARQ information, and control information related to spatial multiplexing (if applicable). A downlink scheduling assignment also includes a command for power control of the Physical Uplink Control Channel (PUCCH) used for transmission of hybrid-ARQ (HARQ) acknowledgements in response to downlink scheduling assignments. The DCI may also include uplink scheduling grants such as Physical Uplink Shared Channel (PUSCH) resource indication, transport format, and hybrid-ARQ-related information. An uplink scheduling grant also includes a command for power control of the PUSCH. The DCI may also include power control commands for a set of terminals as a complement to the commands included in the scheduling assignments/grants.

One PDCCH/EPDCCH carries one DCI message containing one of the groups of information listed above. Because a base station may schedule multiple terminals simultaneously, and each terminal may be scheduled on both downlink and uplink simultaneously, multiple scheduling messages may be transmitted within each subframe. Each scheduling message is transmitted on separate PDCCH/EPDCCH resources. Consequently, multiple simultaneous PDCCH/EPDCCH transmissions are typically within each subframe in each cell. Furthermore, support for different radio-channel conditions may use link adaptation. In link adaptation the code rate of the PDCCH/EPDCCH is selected by adapting the resource usage for the PDCCH/EPDCCH to match the radio-channel conditions.

The LTE Rel-10 standard and above supports bandwidths larger than 20 MHz. One requirement of LTE Rel-10 is backward compatibility with LTE Rel-8. This includes spectrum compatibility. One way to provide compatibility is for an LTE Rel-10 carrier wider than 20 MHz to appear as a number of LTE carriers to an LTE Rel-8 terminal. Each such carrier may be referred to as a Component Carrier (CC).

For early LTE Rel-10 deployments, the number of LTE Rel-10-capable terminals will likely be smaller than the number of LTE legacy terminals already in existence. Thus, efficient use of a wide carrier is needed for legacy terminals, i.e. providing carriers where legacy terminals may be scheduled in all parts of the wideband LTE Rel-10 carrier. One solution uses carrier aggregation. Using carrier aggregation, an LTE Rel-10 terminal may receive multiple component carriers. The components carriers may have the same structure as a Rel-8 carrier.

FIG. 4 illustrates an example of carrier aggregation. A system bandwidth of 100 MHz may be represented by 5 component carriers each with 20 MHz bandwidth. A UE capable of carrier aggregation may be assigned a primary cell (PCell), which is always activated, and one or more secondary cells (SCells) which may be activated or deactivated dynamically.

The number of aggregated component carriers as well as the bandwidth of the individual component carriers may be different for uplink and downlink. A symmetric configuration refers to a configuration where the number of component carriers in downlink is the same as in uplink. An asymmetric configuration refers to a configuration where the number of component carriers is different between downlink and uplink. The number of component carriers configured in a cell may be different from the number of component carriers seen by a terminal. For example, a terminal may support more downlink component carriers than uplink component carriers, even though the cell is configured with the same number of uplink and downlink component carriers.

Carrier aggregation may be used for LAA where the primary carrier (or PCell) operates in licensed spectrum, and one or more secondary carriers (or SCells) operate in unlicensed spectrum.

Another feature of carrier aggregation is the ability to perform cross-carrier scheduling. Cross-carrier scheduling enables a (E)PDCCH on one component carrier to schedule data transmissions on another component carrier using a 3-bit Carrier Indicator Field (CIF) inserted at the beginning of the (E)PDCCH messages. For data transmissions on a given component carrier, a UE expects to receive scheduling messages on the (E)PDCCH of just one component carrier (i.e., either the same component carrier, or a different component carrier via cross-carrier scheduling). The mapping from (E)PDCCH to PDSCH may be configured semi-statically.

In LTE, the scheduling information for uplink and downlink transmissions on the PCell is transmitted on the PCell using (E)PDCCH. LTE refers to this scheduling mechanism as a self-scheduling method. For a SCell, LTE supports two scheduling mechanisms-self-scheduling or cross-scheduling. Using SCell self-scheduling (similar to PCell self-scheduling), the uplink and downlink scheduling information for the SCell is transmitted on the same SCell using (E)PDCCH. In SCell cross-scheduling, the network configures a SCell via higher layer signaling to use a cross-scheduling mechanism. In this approach, the uplink and downlink scheduling information for a SCell is transmitted on a second cell using (E)PDCCH. The second cell may be the PCell or another SCell. In LTE, the downlink and uplink scheduling mechanisms are configured together (i.e., the downlink and uplink transmissions of a cell are either both self-scheduling or both cross-scheduling).

Another wireless network technology that may share unlicensed spectrum with LTE is a wireless local area network (WLAN). Typical WLAN deployments use carrier sense multiple access with collision avoidance (CSMA/CA) for medium access. This means that the channel is sensed to perform a clear channel assessment (CCA), and a transmission is initiated only if the channel is determined to be idle. If the channel is determined to be busy, then the transmission is deferred until the channel is idle. When the range of several access points using the same frequency overlap, all transmissions related to one access point might be deferred when a transmission on the same frequency to or from another access point which is within range is detected. Effectively, if several access points are within range of each other, they will need to share the channel in time, and the throughput for the individual access points may be severely degraded. A general illustration of the listen-before-talk (LBT) mechanism on a single unlicensed channel is shown in FIG. 5.

FIG. 5 illustrates an example WLAN listen-before-talk mechanism. In the case of single-channel LBT, after a first Wi-Fi station transmits a data frame to a second Wi-Fi station, the second station transmits an ACK frame back to the first station with a delay of 16 µs. The ACK frame is transmitted by the second station without performing an LBT operation. To prevent another station interfering with the ACK frame transmission, a station defers for a duration of 34 µs (referred to as DIFS) after the channel is observed to be occupied before assessing again whether the channel is occupied.

Thus, a station that wishes to transmit first performs a clear channel assessment by sensing the medium for a fixed duration DIFS. If the medium is idle, then the station assumes that it may take ownership of the medium and begins a frame exchange sequence. If the medium is busy, the station waits for the medium to go idle, defers for DIFS, and waits for a further random backoff period. To further prevent a station from occupying the channel continuously and thereby preventing other stations from accessing the channel, after a successful transmission, a station performs a random backoff before transmitting again.

For multi-carrier operation, Wi-Fi uses a hierarchical channel bonding scheme to determine its transmission bandwidth for a frame, which could be 20 MHz, 40 MHz, 80 MHz, or 160 MHz, for example. In the 5 GHz band, wider Wi-Fi channel widths of 40 MHz, 80 MHz, 160 MHz or 80+80 MHz are formed by combining 20 MHz sub-channels in a non-overlapping manner. A pre-determined primary channel performs the contention window-based random access procedure after a defer period, if necessary, and then counts down the random number generated. The secondary channels perform a quick CCA check for a PIFS duration (generally 25 μs) before the potential start of transmission to determine if the additional secondary channels are available for transmission. Based on the results of the secondary CCA check, transmission is performed on the larger bandwidths; otherwise transmission falls back to smaller bandwidths. The Wi-Fi primary channel is always included in all transmissions (i.e., transmission on secondary channels alone is not allowed).

LTE has traditionally used dedicated frequency spectrum. An advantage of dedicated spectrum is that an LTE system does not need to coexist with other non-3GPP radio access technologies in the same spectrum, which can maximize spectrum efficiency. The spectrum allocated to LTE, however, is limited. It may not meet the ever increasing demand for larger throughput from applications/services. Therefore, 3GPP also specifies how LTE may use unlicensed spectrum in addition to licensed spectrum. In addition, Standalone LTE-U is under development by the MulteFire Alliance, in which LTE operates solely in unlicensed spectrum.

FIG. 6 illustrates a user equipment with license assisted access to unlicensed spectrum. In license assisted access, a UE is connected to a PCell in the licensed band and one or more SCells in the unlicensed band. A secondary cell in unlicensed spectrum may be referred to as a LAA secondary cell (LAA SCell). The LAA SCell may operate in downlink-only mode or operate with both uplink and downlink traffic. In some scenarios, LTE nodes may operate in standalone mode in license-exempt channels without assistance from a licensed cell.

Unlicensed spectrum can, by definition, be used simultaneously by multiple different technologies. Therefore, LAA must coexist and cooperate with other systems, such as IEEE 802.11 (Wi-Fi). To coexist fairly with a Wi-Fi system, transmission on the SCell conforms to LBT protocols to avoid collisions which may cause severe interference to on-going transmissions. This includes both performing LBT before commencing transmissions, and limiting the maximum duration of a single transmission burst. The maximum transmission burst duration is specified by country and region-specific regulations (e.g., 4 ms in Japan and 13 ms according to EN 301.893). An example is illustrated in FIG. 7.

FIG. 7 illustrates an example of license assisted access to unlicensed spectrum using LTE carrier aggregation and listen-before-talk. FIG. 7 illustrates five example transmission bursts on an LAA SCell. Each transmission burst is constrained by a maximum allowed transmission duration of 4 ms. Before each LAA SCell transmission is a listening period. The example 8 ms burst is divided into two 4 ms bursts with a listening period before each.

Before the eNB transmit data in the downlink, it performs LBT to gain channel access. During the eNB's transmission duration, it also sends out control channels to schedule certain UEs to transmit in the uplink at specific time later. After the eNB releases the channel, the scheduled UEs perform LBT to determine whether they can transmit in the channel at said specific time.

FIG. 8 illustrates an example of uplink license assisted access transmissions based on an uplink listen-before-talk protocol. The illustrated example divides an 8 ms occupancy time into 4 ms for downlink channel occupancy and 4 ms for uplink channel occupancy. After receiving a downlink transmission in subframes n−4 to n−1 (i.e., 4 ms), the UE performs a clear channel access for the uplink at subframe n. If the channel is clear, the UE transmits in uplink for subframes n to n+3 (i.e., 4 ms).

In another approach, the UE does not follow any LBT protocol to initiate channel access after receiving an uplink transmission scheduling command. LBT and CCA are performed by the eNB before the start of downlink transmissions. This may be referred to as a reverse direction grant protocol.

FIG. 9 illustrates an example of uplink license-assisted access transmissions based on a reverse direction grant protocol. The illustrated example divides an 8 ms occupancy time into 4 ms for downlink channel occupancy and 4 ms for uplink channel occupancy. After receiving a downlink transmission in subframes n−4 to n−1 (i.e., 4 ms), the UE transmits in uplink for subframes n to n+3 (i.e., 4 ms) without performing a CCA.

When an eNB obtains an opportunity to transmit in unlicensed spectrum, the opportunity (also referred to as a transmit opportunity (TXOP)), may be shared with UEs that the eNB is serving. Transitions between transmissions from the eNB to transmissions from UEs may be handled in two ways, one where the UEs perform an LBT operation prior to transmission and one where the UEs do not perform an LBT operation.

The case where an LBT operation is not performed will most likely need the gap between downlink transmissions (from the eNB) and uplink transmissions (from the UE(s)) to be no more than 16 μs. When an LBT operation is to be performed for a particular subframe, gaps will need to be inserted in the uplink subframes to allow for the UE to perform a listen-before-talk operation without being interfered by transmissions from other UEs in the same serving cell. To avoid significantly degrading uplink throughput, the gaps should not be too large. Therefore, the gap in an uplink subframe of 14 DFT spread OFDM (DFTS-OFDM) symbols is likely to not be larger than one DFTS-OFDM symbol, which is approximately 71 microseconds in duration.

Performing LBT may generally include two broad categories of LBT operation. A first type uses an LBT procedure with full random backoff similar to what is used by IEEE 802.11 compliant nodes. These schemes are also referred to as Category 4 LBT schemes.

In these schemes a random backoff counter is drawn uniformly randomly in the interval $\{0, CW\}$, where CW is the contention window. The size of the contention window may be approximately doubled every time a collision on the channel is detected. Thus, this procedure may also be referred to as a binary exponential backoff.

The contention window size is limited by a minimum value, CWmin, and a maximum value, CWmax. The values of CWmin and CWmax may vary depending on the priority class of the traffic. For the highest priority class, the $\{CWmin, CWmax\}$ values may be limited to $\{3, 7\}$ where these numbers are counted in increments of one slot which has a duration of 9 microseconds as shown in FIG. 5. There are four defined priority classes. The remaining three priority classes use contention window size pairs of {7, 15}, {15, 63} and {15, 1023}, respectively, for an access point (AP) or an eNB. For Wi-Fi STAs or UEs in LTE, the values of {15, 63} are not used.

In the second type of LBT procedure, a UE may perform an LBT operation for a fixed duration (e.g., 25 μs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

One technique to minimize gaps between downlink and uplink transmissions is to use a timing advance command to advance the timing of the UEs transmissions on the uplink so that they occur earlier. This technique may be used where the eNB may employ transmissions only over a part of the subframe in the last downlink subframe of a transmission burst. In this case, there is a gap within the downlink subframe that can be occupied by uplink transmissions by UEs that have received timing advance (TA) commands.

The use of LTE carrier aggregation (CA), introduced in Rel-10, may increase the peak data rate, system capacity, and user experience by aggregating radio resources from multiple carriers that may reside in the same band or different bands. Rel-13 LAA and Standalone LTE-U offer an ability to operate on multiple carriers in unlicensed spectrum simultaneously. The extension of the CA framework beyond 5 carriers was completed in LTE Rel-13, which supports up to 32 carriers in both uplink and downlink.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE. The contention window sizes to be used at the UE can also be implicitly signaled by indicating whether the transmission is a new transmission or a retransmission.

Existing signaling and contention window management methods, however, do not fully account for the problems that arise when using implicit signaling to indicate contention window size that the UE must use. When explicit signaling is used, it creates unnecessarily large signaling overhead.

SUMMARY

The embodiments described herein include efficiently signaling listen-before-talk (LBT) parameters for a Category 4 LBT scheme to a user equipment (UE), while ensuring that requirements on management of contention windows are met. Particular embodiments facilitate the management of uplink transmissions in unlicensed spectrum by varying the gaps between transmissions by different nodes. Signaling to enable the functionality is disclosed. The disclosure includes the following general solutions for signaling LBT parameters to a UE.

According to some embodiments, a method for use in a UE of transmitting uplink data in unlicensed spectrum comprises receiving, from a network node, an uplink grant comprising an indication of one or more subframes to use for transmitting uplink data. Each subframe comprises a plurality of symbols. The method further comprises obtaining an indication of a LBT type. The LBT type indicates a type of LBT procedure that the UE should perform before transmitting uplink data. The method further comprises determining, using the obtained LBT type, at least one of a starting symbol and a stopping symbol for transmitting uplink data, and transmitting uplink data according to at least one of the determined starting symbol and the determined stopping symbol.

In particular embodiments, the LBT type indicates a category 4 procedure, and the starting symbol comprises the second symbol of the plurality of symbols of the first subframe indicated by the uplink grant. The LBT type may indicate a short clear channel assessment (CCA) procedure, and the starting symbol may comprise the symbol 25 μs after the first symbol of the plurality of symbols of the first subframe indicated by the uplink grant.

In particular embodiments, the LBT type indicates a category 4 procedure or a short clear channel assessment (CCA) procedure, and the stopping symbol comprises the next to last symbol of the plurality of symbols of the last subframe indicated by the uplink grant. The method may further comprise determining that the UE is scheduled to transmit a sounding reference signal (SRS) in the last symbol of the plurality of symbols of the last subframe indicated by the uplink grant, and not transmitting the scheduled SRS.

In particular embodiments, the LBT type indicates no LBT procedure. When other radio technologies are present in the unlicensed spectrum, then the starting symbol comprises the symbol 16 μs after the first symbol of the plurality of symbols of the first subframe indicated by the uplink grant. When other radio technologies are not present in the unlicensed spectrum, then the starting symbol comprises the first symbol of the plurality of symbols of the first subframe indicated by the uplink grant.

In particular embodiments, obtaining the indication of the LBT type comprises receiving signaling from the network node. Obtaining the indication of the LBT type may comprise obtaining a predetermined LBT type unless an LBT type is signaled from the network node. Receiving signaling from the network node may comprise receiving common signaling over a broadcast channel or receiving direct signaling over a unicast channel.

According to some embodiments, a UE operable to transmit uplink data in unlicensed spectrum comprises a memory coupled to processing circuitry. The processing circuitry is operable to receive, from a network node, an uplink grant comprising an indication of one or more subframes to use for transmitting uplink data. Each subframe comprises a plurality of symbols. The processing circuitry is further operable to obtain an indication of a LBT type. The LBT type indicates a type of LBT procedure that the UE should perform before transmitting uplink data. The processing circuitry is further operable to determine, using the obtained LBT type, at least one of a starting symbol and a stopping symbol for transmitting uplink data, and transmit uplink data according to at least one of the determined starting symbol and the determined stopping symbol.

According to some embodiments, a method for use in a UE of transmitting uplink data in unlicensed spectrum comprises receiving, from a network node, an uplink grant comprising an indication of one or more subframes to use for transmitting uplink data; receiving, from the network node, an indication of a last subframe x that is within a maximum channel occupancy time (MCOT) limit based on a downlink burst after a successful category 4 LBT procedure performed by the network node; transmitting uplink data in the one or more subframes of the uplink grant prior to subframe x based on a short clear channel assessment (CCA) procedure; and transmitting uplink data in the one or more subframes of the uplink grant after subframe x based on a category 4 LBT procedure.

In particular embodiments, receiving the indication of the last subframe within the MCOT limit comprises receiving a number of subframes offset from the first subframe of the one or more subframes of the uplink grant. Receiving the indication of the last subframe within the MCOT limit may comprise receiving common signaling over a broadcast channel or receiving direct signaling over a unicast channel.

According to some embodiments, a UE operable to transmit uplink data in unlicensed spectrum comprises a memory coupled to processing circuitry. The processing circuitry is operable to: receive, from a network node, an uplink grant comprising an indication of one or more subframes to use for transmitting uplink data; receive, from the network node, an indication of a last subframe (x) that is within a MCOT limit based on a downlink burst after a successful category 4 LBT procedure performed by the network node; transmit uplink data in the one or more subframes of the uplink grant prior to subframe x based on a short CCA procedure; and transmit uplink data in the one or more subframes of the uplink grant after subframe x based on a category 4 LBT procedure.

Also disclosed is a computer program product. The computer program product comprises instructions stored on non-transient computer-readable media which, when executed by a processor, perform the act of receiving, from a network node, an uplink grant comprising an indication of one or more subframes to use for transmitting uplink data. Each subframe comprises a plurality of symbols. The instructions further perform the act of obtaining an indication of a LBT type. The LBT type indicates a type of LBT procedure that the UE should perform before transmitting uplink data. The instructions further perform the acts of determining, using the obtained LBT type, at least one of a starting symbol and a stopping symbol for transmitting uplink data, and transmitting uplink data according to at least one of the determined starting symbol and the determined stopping symbol.

Also disclosed is another computer program product. The computer program product comprises instructions stored on non-transient computer-readable media which, when executed by a processor, perform the acts of receiving, from a network node, an uplink grant comprising an indication of one or more subframes to use for transmitting uplink data; receiving, from the network node, an indication of a last subframe (x) that is within a MCOT limit based on a downlink burst after a successful category 4 LBT procedure performed by the network node; transmitting uplink data in the one or more subframes of the uplink grant prior to subframe x based on a short CCA procedure; and transmitting uplink data in the one or more subframes of the uplink grant after subframe x based on a category 4 LBT procedure.

Particular embodiments may exhibit some of the following technical advantages. For example, particular embodiments may improve uplink and/or system performance by reducing the amount of signaling, which may reduce network load and device complexity. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
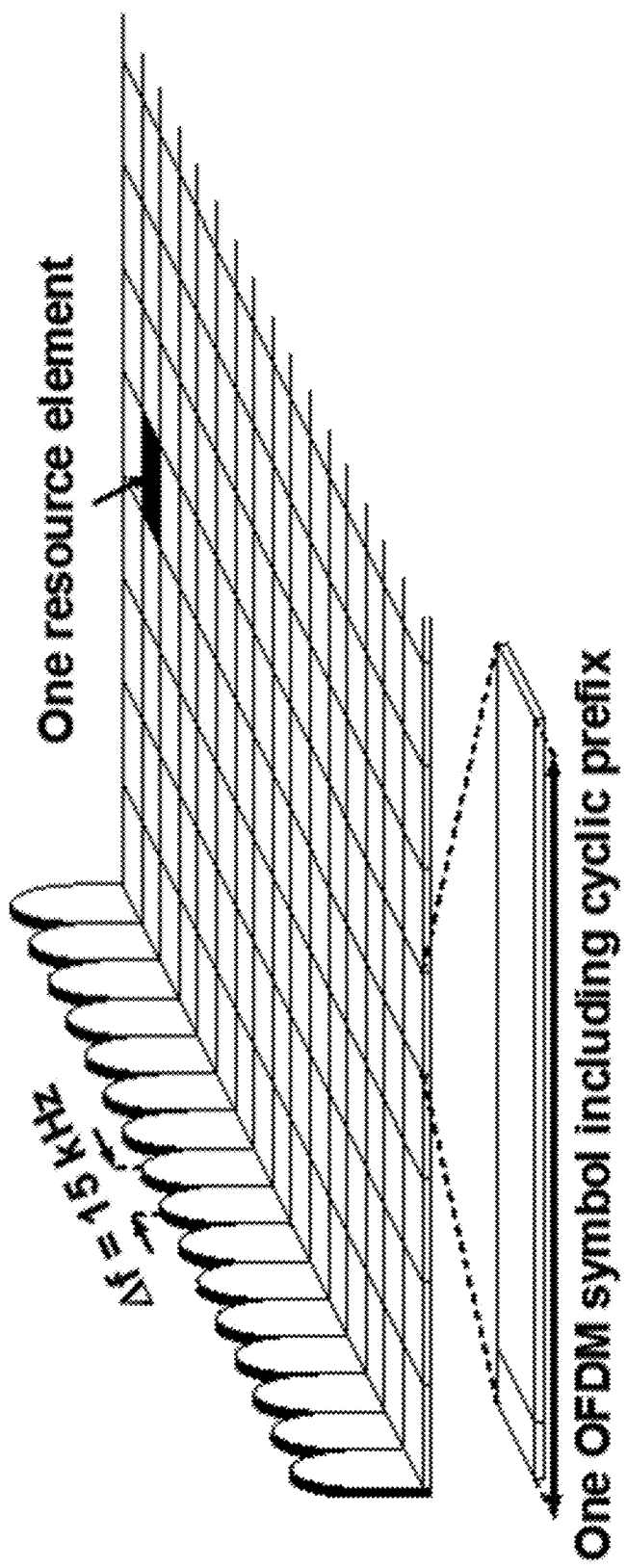
FIG. 1 illustrates an example OFDM symbol.

Long term evolution (LTE) equipment may operate in the unlicensed 5 GHz radio spectrum according to the Third Generation Partnership Project (3GPP) initiative referred to as License Assisted Access (LAA). The unlicensed 5 GHz spectrum is used as a complement to the licensed spectrum. Accordingly, devices connect in the licensed spectrum (primary cell or PCell) and use carrier aggregation to benefit from additional transmission capacity in the unlicensed spectrum (secondary cell or SCell).

Regulatory requirements may not permit transmissions in the unlicensed spectrum without prior channel sensing. This is because the unlicensed spectrum is shared with radios of similar or dissimilar wireless technologies. Wireless devices may perform channel sensing using a listen-before-talk (LBT) method. The LBT method includes sensing the transmission medium for a pre-defined minimum amount of time and backing off if the channel is busy. The maximum duration of a single transmission burst may be limited to a fixed time.

The form of LBT may depend on the number of UEs that are scheduled, the number of subframes that are scheduled in succession, the length of the previous transmissions on the carrier, and/or other such factors. Some parameters related to LBT may be signaled by the eNB to UEs so that the UEs may perform LBT before transmission. The signaling parameters, however, do not fully encompass all the use cases and problems that may be encountered for uplink transmissions in unlicensed spectrum.

When an eNB obtains an opportunity to transmit in unlicensed spectrum, the transmit opportunity may be shared with UEs that the eNB is serving. Transitions between transmissions from the eNB to transmissions from UEs may be handled in two ways, one where the UEs perform an LBT operation prior to transmission and one where the UEs do not perform an LBT operation.

Performing LBT may generally include two broad categories of LBT operation. A first type uses an LBT procedure with full random backoff similar to what is used by IEEE 802.11 compliant nodes. These schemes are also referred to as Category 4 LBT schemes. A random backoff counter is picked randomly in the contention window. The size of the contention window may be approximately doubled every time a collision on the channel is detected. Thus, this procedure may also be referred to as a binary exponential backoff.

In the second type of LBT procedure, a UE may perform an LBT operation for a fixed duration (e.g., 25 µs). Generally, the second type of LBT is preferable for transitions between downlink and uplink transmissions, because it minimizes the probability of another node completing its LBT operations and commencing transmissions on the channel. Many situations, however, may need to use a Category 4 LBT scheme.

3GPP specifications may include multi-subframe scheduling for Rel-14 LAA where one or more uplink grants transmitted in a single subframe can schedule uplink data in multiple subframes. The parameters that are signaled as part of the multi-subframe scheduling grant include hybrid ARQ acknowledgements (HARQ-ACKs) and related parameters. Specifically, the grants include legacy parameters (i.e., the new data indication (NDI), redundancy version (RV), and the HARQ-ACK bits themselves, which generally consist of one bit per transport block that is being acknowledged).

Signaling of LBT parameters for LAA may use both explicit and implicit methods. The solutions include signaling of random backoff parameters such as the random backoff counter, contention window sizes, and the LBT priority class to be used. The signaling of these parameters may vary depending on factors such as the load and the set of UEs being multiplexed in a single subframe. Implicit signaling of the LBT priority class to be used can be based on various factors including the number of contiguous subframes that have been scheduled to the UE.

Existing signaling and contention window management methods, however, do not fully account for the problems that arise when using implicit signaling to indicate contention window size that the UE must use. When explicit signaling is used, it creates unnecessarily large signaling overhead.

Particular embodiments obviate the problems described above and include signaling LBT parameters for a Category 4 LBT scheme to a UE more efficiently, while ensuring that requirements on management of contention windows are met. Particular embodiments facilitate the management of uplink transmissions in unlicensed spectrum by providing the ability to vary the gaps between transmissions by different nodes. Some embodiments include signaling to enable the functionality.

The embodiments described herein are applicable to both LAA LTE and standalone LTE-U operation, and in general for any system such as LTE operating in unlicensed spectrum or any spectrum where listen-before-talk protocols are used and where there is some fixed timing where transmissions occur.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 10-14B of the drawings, like numerals being used for like and corresponding parts of the various drawings. LTE is used throughout this disclosure as an example cellular system, but the ideas presented herein may apply to other wireless communication systems as well.

Figure 10:
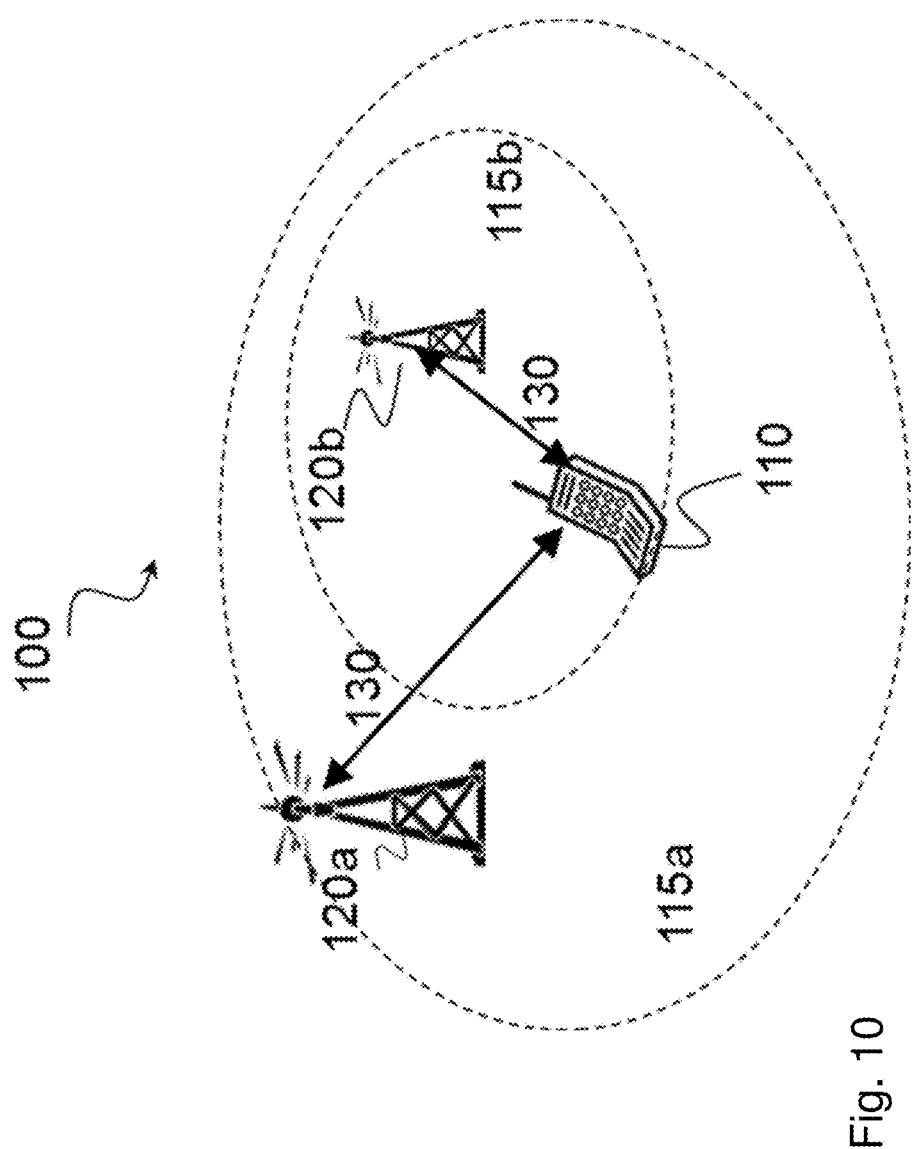
FIG. 10 is a block diagram illustrating an example wireless network, according to a particular embodiment.

FIG. 10 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Figure 2:
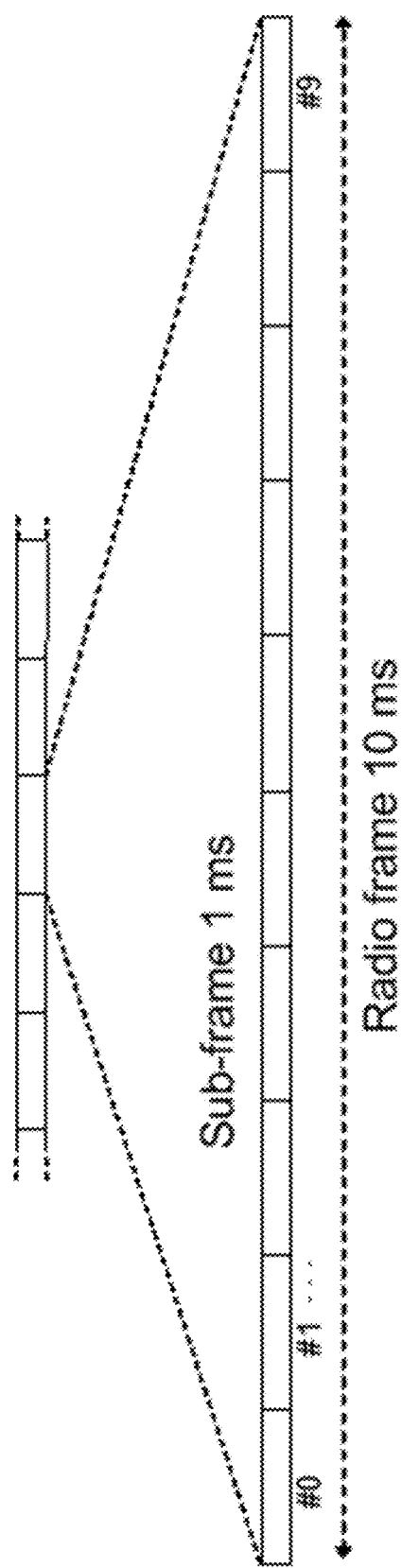
FIG. 2 illustrates an example radio frame.
Figure 3:
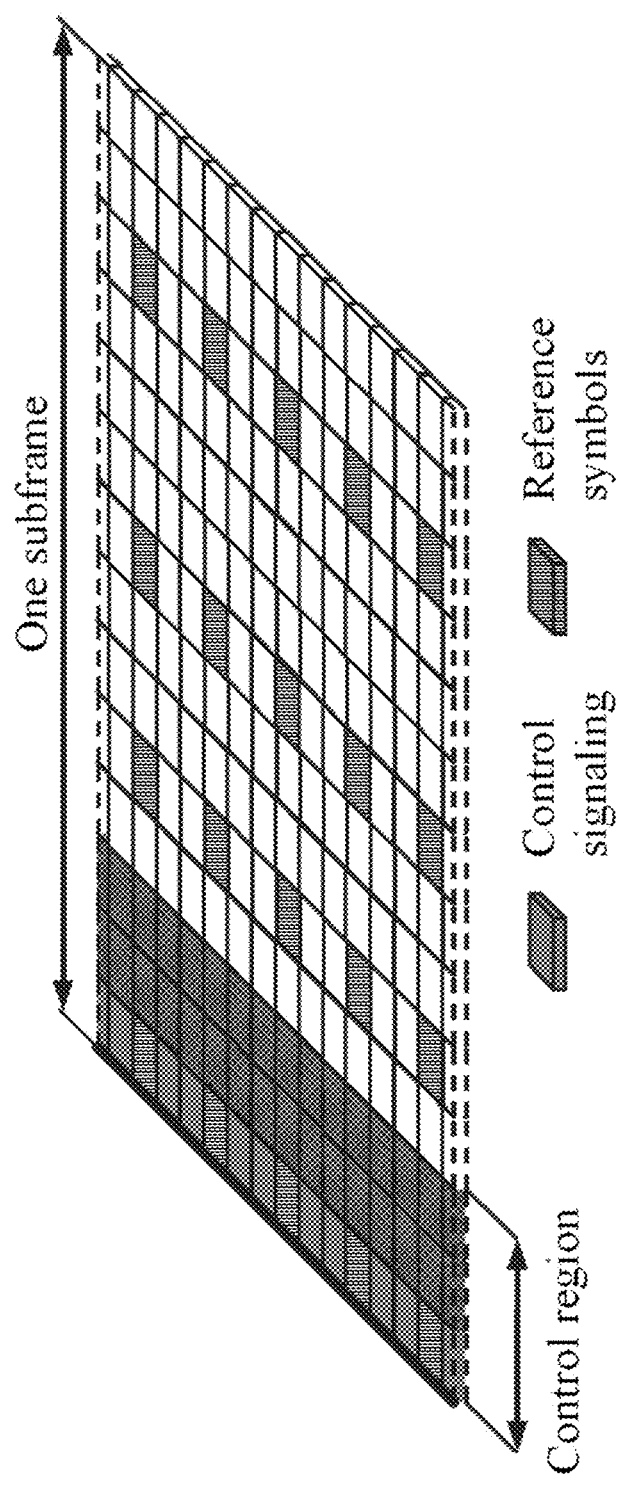
FIG. 3 illustrates an example downlink subframe.
Figure 4:
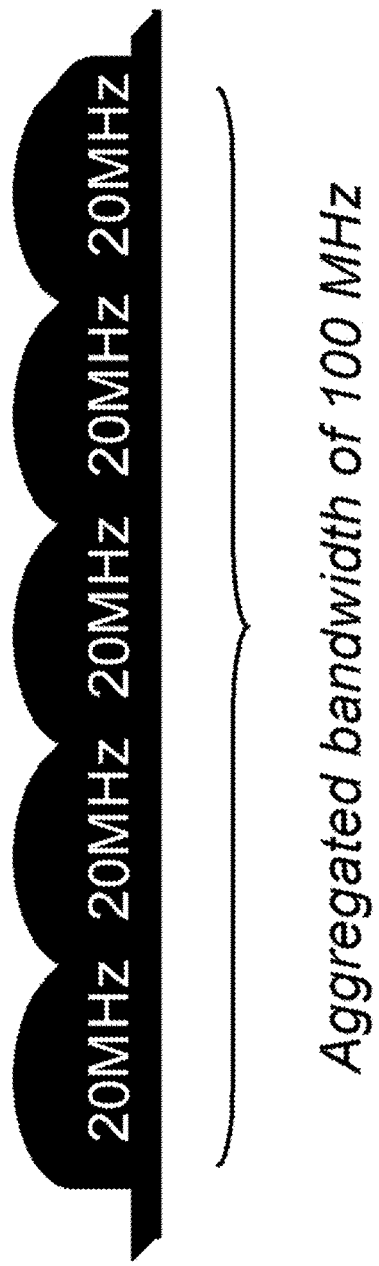
FIG. 4 illustrates an example of carrier aggregation.
Figure 5:
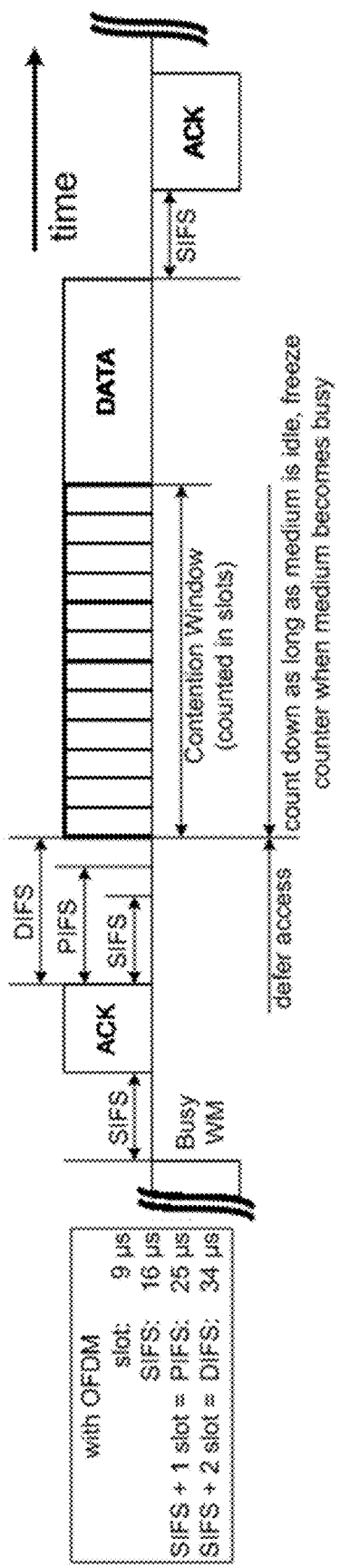
FIG. 5 illustrates an example WLAN listen-before-talk mechanism.
Figure 6:
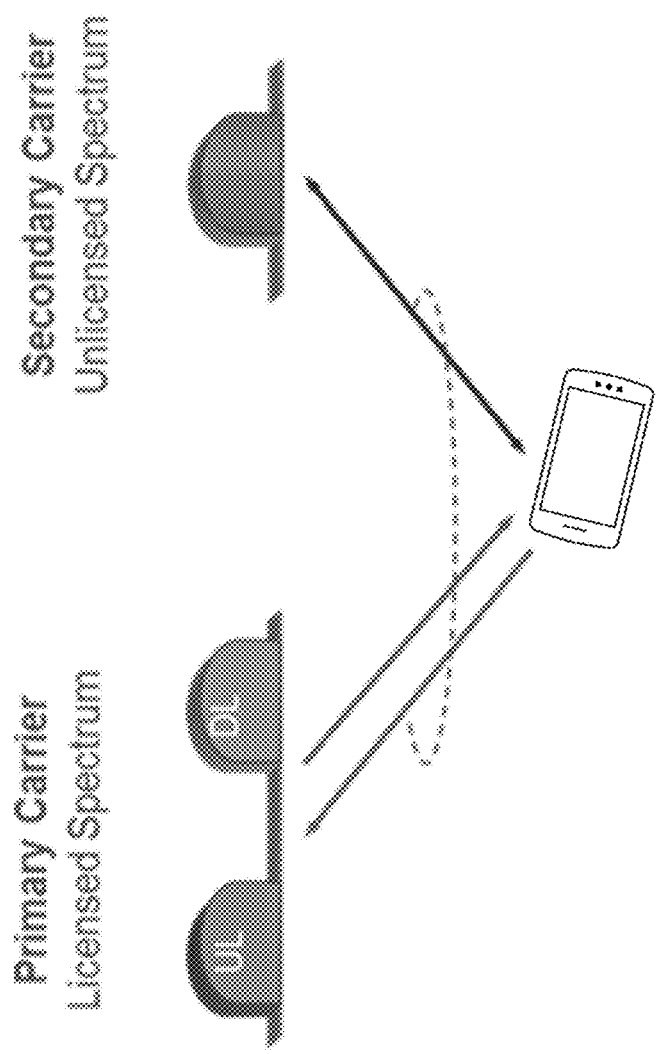
FIG. 6 illustrates a user equipment with license assisted access to unlicensed spectrum.
Figure 7:
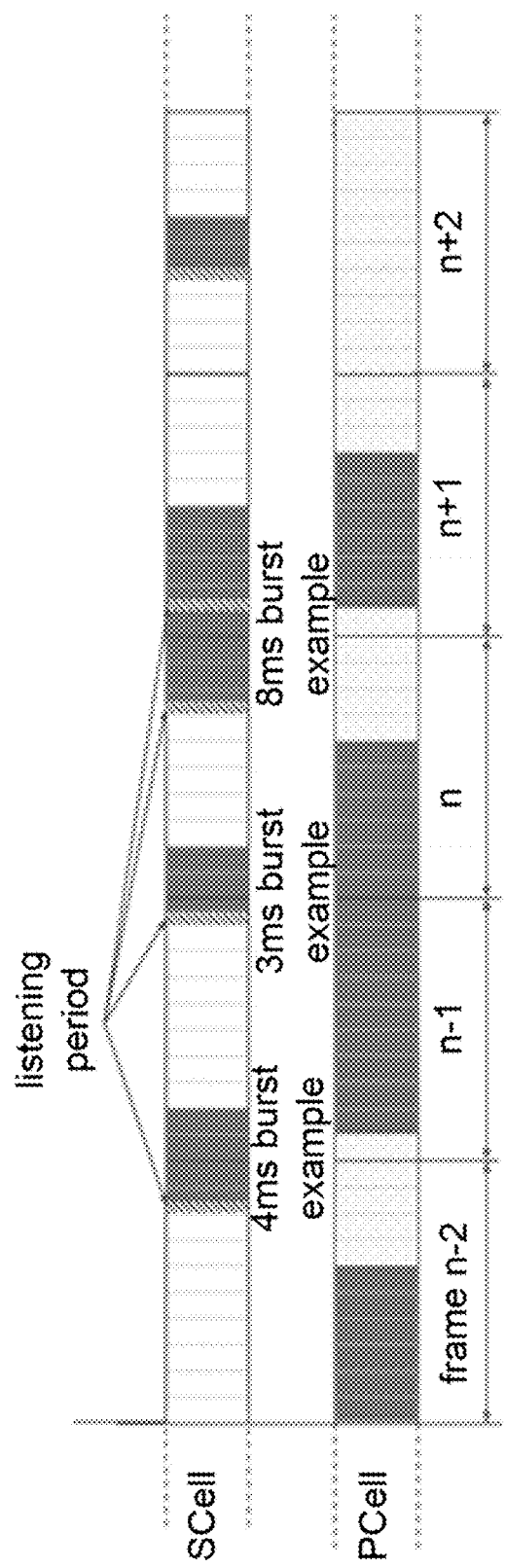
FIG. 7 illustrates an example of license assisted access to unlicensed spectrum using LTE carrier aggregation and listen-before-talk.

Wireless signals 130 may include frames and subframes, such as those described with respect to FIGS. 1-3. Network node 120 may dynamically schedule subframes as an uplink subframe, a downlink subframe, or a combination uplink and downlink subframe. Network node 120 may signal LBT parameters to wireless device 110.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, network node 120a may dynamically schedule uplink and downlink subframes for wireless device 110. For example, in particular embodiments network node 120a may determine a first uplink/downlink scheduling pattern for a first plurality of consecutive subframes. Network node 120a may transmit the first uplink/downlink scheduling pattern to wireless device 110 (e.g., using (E)PDCCH) and transmit at least one subframe to wireless device 110 according to the first uplink/downlink scheduling pattern.

If network node 120a received additional downlink data, or a request for uplink transmission from a wireless device, for example, then network node 120a may determine a second uplink/downlink scheduling pattern for a second plurality of consecutive subframes. Network node 120a may transmit the second uplink/downlink scheduling pattern to wireless device 110 in any of the subframes previously scheduled for wireless device 110.

In particular embodiments, the uplink/downlink scheduling pattern may comprise a number of subsequent downlink subframes, a number of subsequent downlink and uplink subframes, an indication of which subframes to monitor or not monitor for downlink, or any other suitable pattern.

In particular embodiments, wireless device 110 may receive, from network node 120 (e.g., using (E)PDCCH), a first uplink/downlink scheduling pattern for a first plurality of consecutive subframes. Wireless device 110 may receive at least one subframe according to the first uplink/downlink scheduling pattern. In one of the scheduled downlink subframes, wireless device 110 may receive a second uplink/downlink scheduling pattern for a second plurality of consecutive subframes.

According to some embodiments, wireless device 110 may receive, from network node 120, an uplink grant comprising an indication of one or more subframes to use for transmitting uplink data. Each subframe comprises a plurality of symbols. Wireless device 110 may obtain an indication of a LBT type. The LBT type indicates a type of LBT procedure that the UE should perform before transmitting uplink data. Wireless device 110 may determine, using the obtained LBT type, at least one of a starting symbol and a stopping symbol for transmitting uplink data. Wireless device 110 may transmit uplink data according to at least one of the determined starting symbol and the determined stopping symbol.

According to some embodiments, wireless device 110 may receive, from network node 120, an indication of a last subframe x that is within a maximum channel occupancy time (MCOT) limit based on a downlink burst after a successful category 4 LBT procedure performed by the network node. Wireless device 110 may transmit uplink data in the one or more subframes of the uplink grant prior to subframe x based on a short clear channel assessment (CCA) procedure, and transmit uplink data in the one or more subframes of the uplink grant after subframe x based on a category 4 LBT procedure.

Although particular embodiments are described with respect to licensed or unlicensed spectrum, license assisted access, and/or carrier aggregation, the embodiments described herein apply equally to uplink and downlink scheduling in any spectrum and with respect to a single cell or any combination of cells.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 13A below. Similarly, a network node may include any suitable combination of hardware and/or software. For example, in particular embodiments, a network node, such as network node 120, may include the components described with respect to FIG. 14A below.

The following embodiments describe LBT parameters for a Category 4 LBT scheme that may be signaled to the UE more efficiently while ensuring that requirements on management of contention windows are met. Particular embodiments manage the contention window size of a Category 4 LBT scheme used by the UE in a particular uplink subframe. Particular embodiments may enable the management of uplink transmissions in unlicensed spectrum by providing the ability to vary the gaps between transmissions by different nodes. Gaps may be varied by varying the start or stop symbols for transmission in an uplink subframe.

Particular embodiments include implicit signaling of a start symbol based on LBT type. For example, in some embodiments the explicit signaling of the start symbol of the PUSCH in the first subframe of a set of subframes that is allocated in a single uplink grant message may be avoided. The start symbol of the PUSCH may instead be obtained from the LBT type which may be signaled to the UE. The options for the LBT type may include a category 4 LBT scheme, a short 25 μs CCA, or no LBT.

Some embodiments may use the following procedure to determine the start symbol of the PUSCH in the first allocated subframe. If the LBT type is Category 4, then PUSCH starts at symbol 1. If the LBT type is a CCA of 25 μs, then PUSCH starts 25 μs after the start of symbol 0. If the LBT type is no LBT and it is known that other technologies are present in the band, PUSCH starts 16 μs after the start of symbol 0. If the LBT type is no LBT and it is known that other technologies are not present in the band (e.g., via configuration by an entity that controls frequency channel allocation), then the PUSCH starts at the symbol boundary of symbol 0. Other embodiments may determine a start symbol using any suitable offset.

Particular embodiments include signaling that indicates how LBT parameters are signaled. For example, particular embodiments may signal certain LBT parameters via dedicated signaling; whereas, some other embodiments may signal certain LBT parameters via common signaling to all UEs.

As a particular example, if a network node is to signal an LBT type for a certain set of subframes for which the starting subframe may vary by up to 8 subframes and the number of subframes in the set may vary by up to 4 subframes, then five bits are required to indicate the LBT type and the number of subframes for which the LBT type is applicable. However, because uplink grants already include information on location of the allocations in time, the LBT type for the first of these subframes can be indicated by one additional bit in the dedicated uplink grant.

If the number of UEs scheduled for the subframes is less than five, then the dedicated signaling is not wasteful. However, if the number of UEs to be scheduled in the subframes far exceeds five, then a common message in the C-PDCCH may be more efficient in indicating the subframe where a certain LBT type is to be used. Common messages in the C-PDCCH can also be used to indicate LBT parameters to be used for autonomous uplink transmissions which occur without explicit scheduling grants.

In some embodiments, whether LBT parameters are signaled via common signaling (e.g., the C-PDCCH on an LAA SCell) or signaled via dedicated signaling (e.g., the DCI message conveying uplink grants to the UEs) may be configured via radio resource control (RRC) signaling at a higher layer. This provides the eNB flexibility to optimize the efficiency of the dynamic signaling based on the deployment and number of UEs to be served on average in a subframe in the cell. If dedicated signaling does not need to be used, then the bits that would have been used for signaling may be used for some other purpose.

Particular embodiments include signaling a maximum channel occupancy time (MCOT) limit to the UE. For example, in some embodiments when there is a downlink transmission from an eNB in subframe n in a downlink transmission burst after a successful Category 4 LBT with an associated MCOT, the eNB can determine the subframe (e.g., subframe n+x) that meets the MCOT limit. That means the uplink transmission by UEs before that subframe (i.e., subframe n+x−1) can be based on a CCA of 25 μs, while the uplink transmission from that subframe (i.e., subframe n+x) may be based on Category 4 LBT until the UE detects a new downlink transmission.

In embodiments with common signaling to all UEs, the eNB may signal the value of x using k bits. The number k can be fixed or can be configured by higher layers. For example larger number of k can be used at low loads and smaller number of k can be used at high loads.

In embodiments with dedicated signaling, in a first approach the eNB can signal x using k bits, as mentioned above. In a second approach, the eNB signals how many of the scheduled subframes among the N subframes indicated in the dedicated signaling are subject to Category 4 LBT (or CCA based on 25 us LBT) transmission. In a third approach, the eNB ensures that in every scheduling grant for a set of subframes only one type of LBT option is valid. Thus, by using one bit the eNB can signal if the scheduled subframes corresponding to the grant in the dedicated signaling (i.e., uplink grant) are subject to CCA of 25 us or Category 4 LBT.

Particular embodiments include signaling of an end symbol based on LBT type. For example, particular embodiments include four LBT priority classes that a UE can use to perform Category 4 LBT. Depending on the type of traffic to be sent on the uplink, the UE can choose the LBT priority class accordingly, similar to Wi-Fi or Rel-13 LAA. For example, LBT priority class 1, 2, 3 and 4 may correspond to VoIP, Video, Best effort and Background traffic, respectively.

Based on a buffer status, the eNB is aware of the possible QoS of the potential uplink traffic. The eNB may use this knowledge, together with the number of scheduled uplink subframes, to understand the LBT priority class that the UE will use in case it performs Category 4 LBT. Moreover, from knowledge of whether the previous retransmissions have failed or not, the eNB knows whether the UE will increase the contention window size.

Depending on the size of the contention window, the eNB can determine whether UEs performing Category 4 LBT can benefit from a larger gap than one symbol at the end of the subframe that is not going to be interfered by other UEs. If a larger gap is needed, the eNB may signal to the UE(s) to provide that gap. Another reason for providing larger gaps includes the scenario where a downlink transmission based on Category 4 LBT follows after the uplink transmission.

In embodiments with common signaling, the eNB may signal all the UEs that can have uplink transmission based on CCA of 25 us LBT, not to transmit in the last symbol at the MCOT limit. This can be done using one bit. In the event that one or more such UEs were also requested to send aperiodic SRS in the same subframe, the SRS transmission in symbol thirteen may be dropped and the gap instruction may be prioritized. The eNB may also use an additional bit to indicate to all UEs subject to uplink transmission based on Category 4 to finish their last uplink transmission one symbol before the subframe boundary. The signaling to UEs using both types of LBT types may be signaled using the same bit as well.

In the case where the eNB schedules transmissions such that in every scheduling grant for a set of subframes only one type of LBT option is valid, the eNB can use one bit to signal to the UE to finish its last uplink transmission one symbol before the subframe boundary.

Particular embodiments include implicit or explicit signaling of the NO-LBT option. For example, particular embodiments include conditions that UE would be allowed to transmit in uplink without performing LBT.

An example for the no-LBT condition is described in the 3GPP specifications. In the 3GPP example, no LBT is required for any uplink transmission that begins no later than 16 μs after the end of a downlink transmission. The eNB should ensure that the uplink transmission is within the MCOT limit. The duration of the uplink transmission should include at least UCI or SRS, and its duration shall not exceed 1 ms.

Thus, when a UE fulfills the above conditions, it may transmit within 16 us without LBT while fulfilling the requirements on the uplink transmission without any signaling from the eNB (for example its duration and also its content). However, if two or more UEs are scheduled simultaneously after downlink subframes, but not all of them meet the conditions for no-LBT transmission (such as no UCI or SRS to be transmitted in the first uplink subframe immediately after downlink subframe), then the eNB may determine that the UEs that are eligible for no-LBT transmission need to perform LBT. That can be done using one bit. The bit can be sent by common signaling or dedicated signaling and can be a part of the signaling options as outlined in the embodiments described above.

Other embodiments may use one bit in the common signaling or dedicated signaling to inform UE(s) eligible to transmission without LBT, to perform uplink transmission without LBT whenever the condition is met. In some embodiments, the eNB may assume whenever UE is eligible for transmission without LBT, the UE transmits without LBT and no signaling may be needed. In particular embodiments, signaling for the no LBT option is avoided by restricting it for use only in the ending partial subframe.

Particular embodiments include signaling LBT information to the UE with a combination of dedicated and common signaling. For example, in particular embodiments the signaling of LBT parameters may be performed by a combination of dedicated and common signaling. According to one example, the UE may be provided allocations for uplink transmissions via dedicated signaling with the LBT type signaling not being signaled to the UE. The UE may assume that it should use a 25 μs CCA for the first subframe in the allocation unless otherwise indicated by common signaling. The common signaling that can be used to provide such indication can, for example, be the MCOT limits as described in other embodiments. In a variation of this embodiment, the UE may assume that it should use a Category 4 LBT procedure for the first subframe in the allocation unless otherwise indicated by common signaling.

Other example combinations of common and dedicated signaling that may be included in some embodiments include: (a) signaling of LBT type via dedicated signaling and ending symbol of PUSCH via common signaling; (b) signaling of ending symbol of PUSCH via dedicated signaling and LBT type via common signaling (in one variation, the LBT type may be implicitly signaled using signaling on the MCOT limit); and (c) signaling of all LBT parameters via common signaling but signaling the downlink subframe number where the common signaling is to be received in the dedicated signaling The examples and embodiments described above may be represented generally by the flow diagrams in FIGS. 11 and 12.

Figure 11:
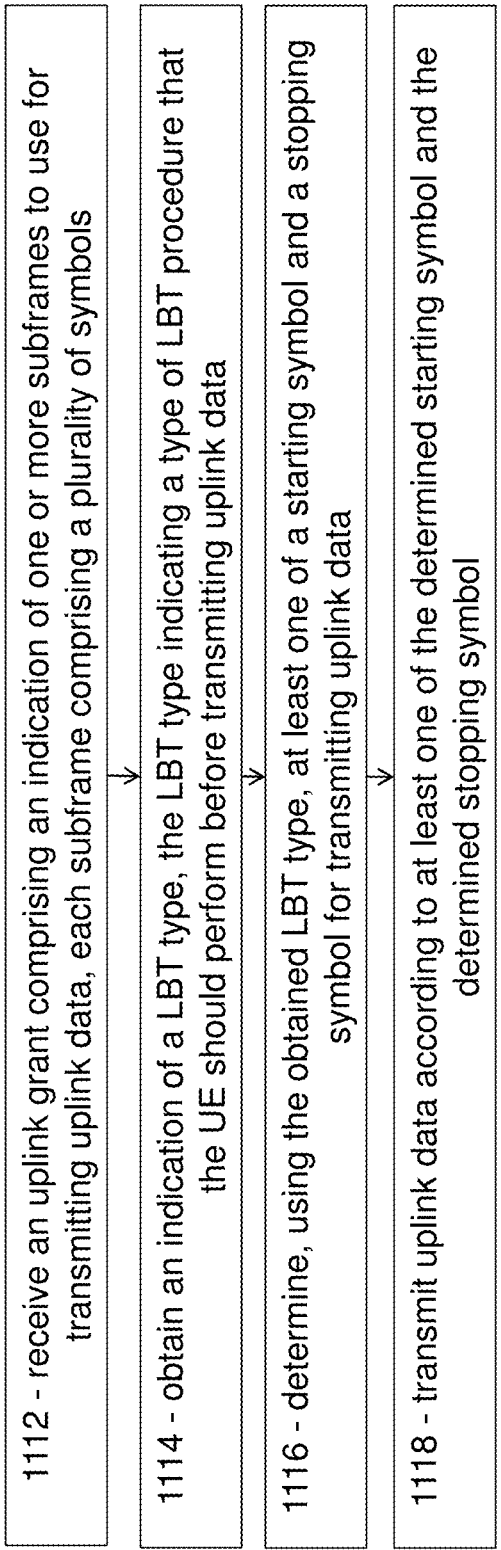
FIG. 11 is a flow diagram illustrating an example method in a user equipment, according to some embodiments.

FIG. 11 is a flow diagram illustrating an example method in a user equipment, according to some embodiments. In particular embodiments, one or more steps of FIG. 11 may be performed by wireless device 110 of wireless network 100 described with respect to FIG. 10.

The method begins at step 1012, where a wireless device receives an uplink grant comprising an indication of one or more subframes to use for transmitting uplink data. Each subframe comprises a plurality of symbols. For example, wireless device 110 may receive an uplink grant from network node 120. The uplink grant may include a burst of 3 subframes where each subframe comprises 14 OFDM symbols.

At step 1114, the wireless device obtains an indication of a LBT type. The LBT type indicates a type of LBT procedure that the UE should perform before transmitting uplink data. For example wireless device 110 may obtain an LBT type from network node 120. The LBT type may refer to a category 4 LBT procedure, a CCA, or no LBT procedure.

In particular embodiments, the wireless device may obtain the LBT type via dedicated signaling. For example, the wireless device may receive the LBT type as part of its uplink grant (i.e., unicast). Or the wireless device may receive the LBT type via common signaling, such as broadcast on the C-PDCCH.

In particular embodiments, obtaining the LBT type may comprise obtaining a predetermined default LBT type. For example, wireless device 110 may be preconfigured to use a category 4 LBT procedure unless otherwise signaled by network node 120. In particular embodiments, the wireless device may obtain the LBT type according to any of the examples or embodiments described above.

At step 1116, the wireless device determines, using the obtained LBT type, at least one of a starting symbol and a stopping symbol for transmitting uplink data. For example, wireless device 110 may use the LBT type to determine whether any gap should be added to the beginning or end of the uplink transmission.

As particular examples, if the LBT type indicates a category 4 procedure, then the starting symbol may comprise the second symbol of the plurality of symbols of the first subframe indicated by the uplink grant (i.e., OFDM symbol 1 for a subframe with 14 symbols numbered 0-13). If the LBT type indicates a short CCA procedure, then the starting symbol comprises the symbol 25 μs after the first symbol of the plurality of symbols of the first subframe indicated by the uplink grant (i.e., 25 μs after OFDM symbol 0 for a subframe with 14 symbols numbered 0-13). If the LBT type indicates no LBT procedure, and the UE determines that other radio technologies are present in the unlicensed spectrum, then the starting symbol comprises the symbol 16 μs after the first symbol of the plurality of symbols of the first subframe indicated by the uplink grant (i.e., 16 μs after OFDM symbol 0 for a subframe with 14 symbols numbered 0-13). If the LBT type indicates no LBT procedure, and the UE determines that other radio technologies are not present in the unlicensed spectrum, then the starting symbol comprises the first symbol of the plurality of symbols of the first subframe indicated by the uplink grant (i.e., OFDM symbol 0 for a subframe with 14 symbols numbered 0-13).

As further examples, if the LBT type indicates a category 4 procedure or a short clear channel assessment (CCA) procedure, then the stopping symbol comprises the next to last symbol of the plurality of symbols of the last subframe indicated by the uplink grant (i.e., OFDM symbol 12 for a subframe with 14 symbols numbered 0-13). In some embodiments, if the wireless device is supposed to transmit SRS in the last symbol of the subframe, then the wireless device may determine not to transmit the SRS.

Particular embodiments may determine a starting or stopping symbol according to any of the examples or embodiments described above. Although particular examples are given, other embodiments may use any suitable starting symbol or any suitable stopping symbol.

At step 1118, the wireless device transmits uplink data according to at least one of the determined starting symbol and the determined stopping symbol. For example, wireless device 110 may transmit a PUSCH using at least one of the starting or stopping symbols determined in the previous step.

Modifications, additions, or omissions may be made to method 1100. Additionally, one or more steps in method 1100 of FIG. 11 may be performed in parallel or in any suitable order. The steps of method 1100 may be repeated over time as necessary.

Figure 12:
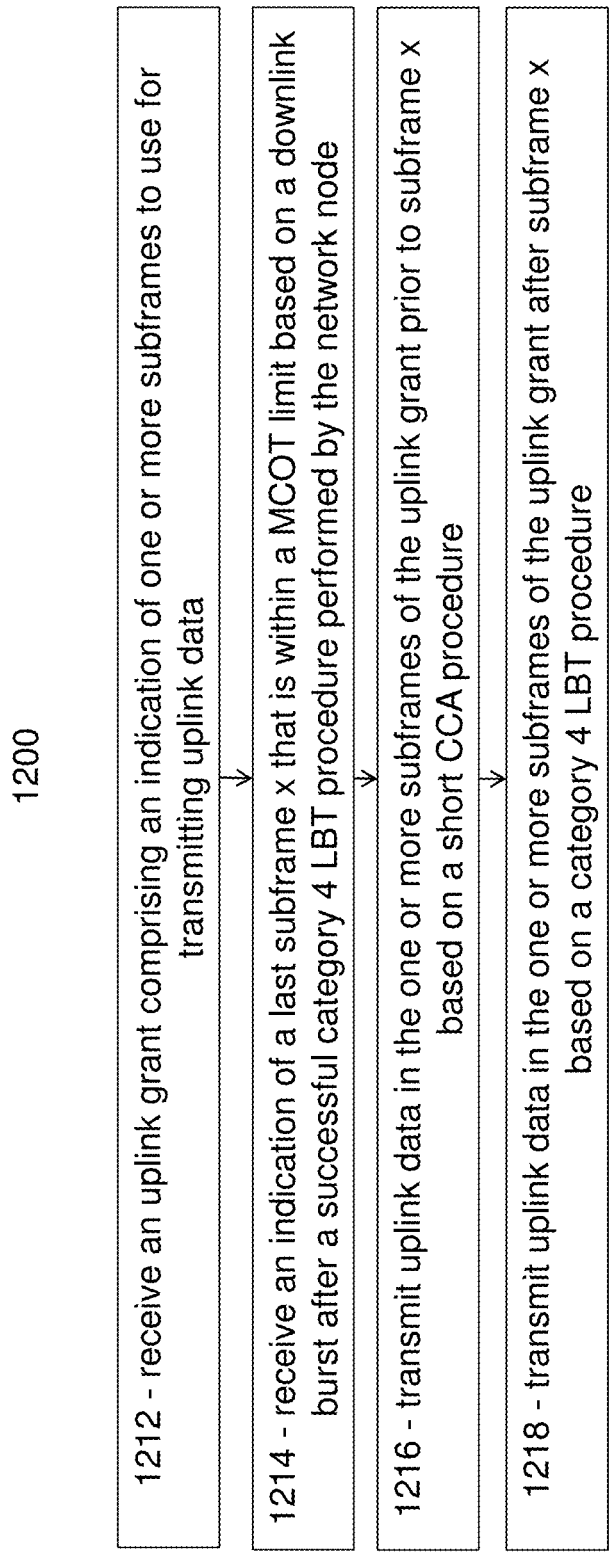
FIG. 12 is a flow diagram illustrating another example method in a user equipment, according to some embodiments.

FIG. 12 is a flow diagram illustrating another example method in a wireless device, according to some embodiments. In particular embodiments, one or more steps of FIG. 12 may be performed by wireless device 110 of wireless network 100 described with respect to FIG. 10.

The method begins at step 1212, where a wireless device receives an uplink grant comprising an indication of one or more subframes to use for transmitting uplink data. For example, wireless device 110 may receive an uplink grant from network node 120.

At step 1214, the wireless device receives an indication of a last subframe x that is within a MCOT limit based on a downlink burst after a successful category 4 LBT procedure performed by the network node. For example, network node 120 may have performed a successful category 4 LBT procedure and transmitted downlink information to one or more wireless devices 110. The downlink may not have consumed the full amount of time available within the MCOT limit, leaving time available for wireless device 110 to transmit some uplink data without performing its own category 4 LBT procedure.

The wireless device may receive the indication via common or direct signaling according to any of the examples and embodiments described above. The subframe x may be indicated by a an offset (e.g., x subframes from the first subframe in the uplink grant) or by any of the examples or embodiments described above.

At step 1216, the wireless device transmits uplink data in the one or more subframes of the uplink grant prior to subframe x based on a short CCA procedure. For example, wireless device 110 may perform a CCA procedure and then transmit uplink up to the MCOT limit.

At step 1218, the wireless device transmits uplink data in the one or more subframes of the uplink grant after subframe x based on a category 4 LBT procedure. For example, wireless device 110 may perform a category 4 LBT procedure just after the MCOT limit and then continue to transmit uplink data to network node 120 assuming the LBT procedure was successful.

Modifications, additions, or omissions may be made to method 1200. Additionally, one or more steps in method 1200 of FIG. 12 may be performed in parallel or in any suitable order. The steps of method 1200 may be repeated over time as necessary.

Figure 8:
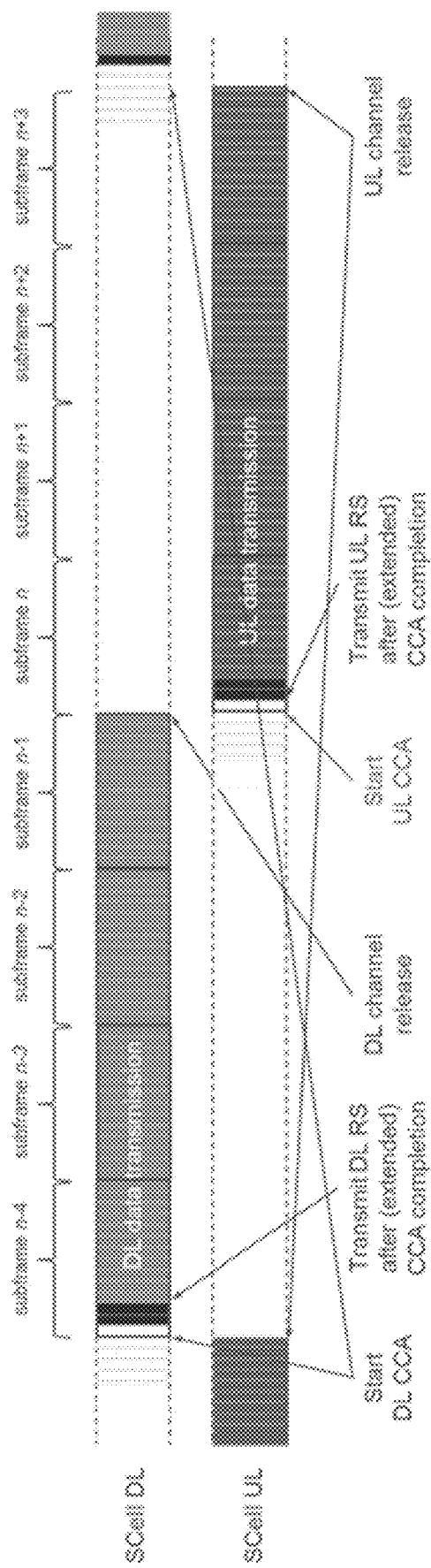
FIG. 8 illustrates an example of uplink license assisted access transmissions based on an uplink listen-before-talk protocol.
Figure 9:
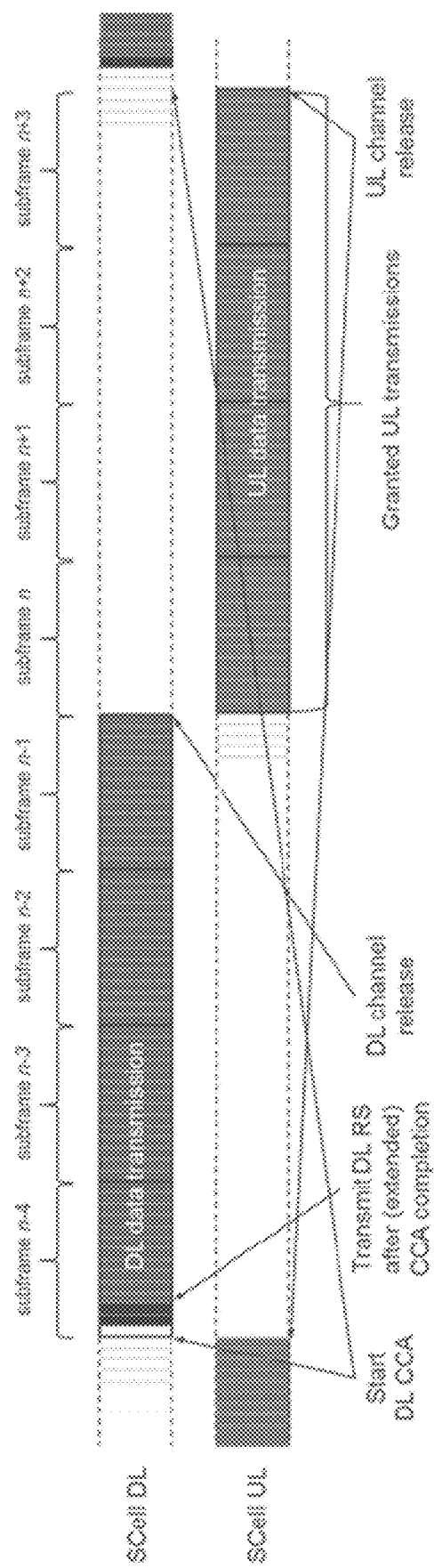
FIG. 9 illustrates an example of uplink license assisted access transmissions based on a reverse direction grant protocol.
Figure 13B:
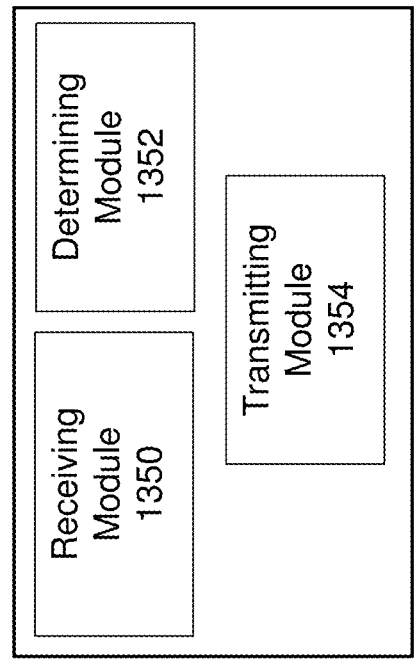
FIG. 13B is a block diagram illustrating example components of a wireless device.
Figure 13A:
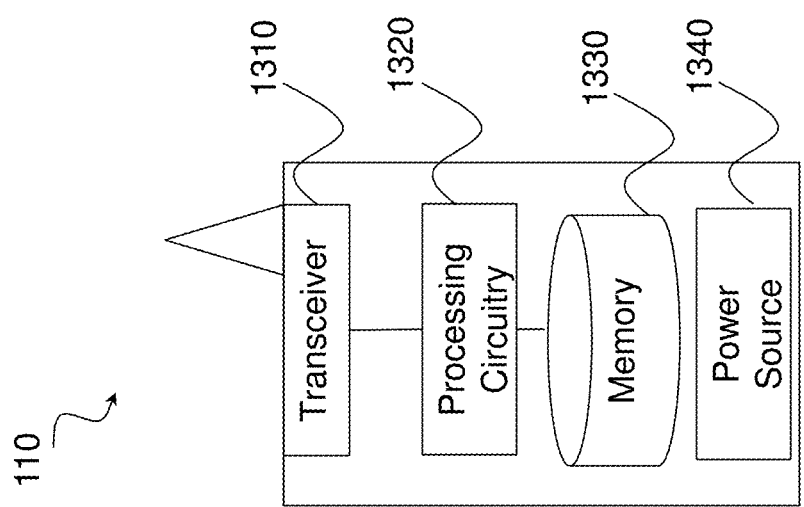
FIG. 13A is a block diagram illustrating an example embodiment of a wireless device.

FIG. 13A is a block diagram illustrating an example embodiment of a wireless device. The wireless device is an example of the wireless devices 110 illustrated in FIG. 8. In particular embodiments, the wireless device is capable of performing LBT procedures before transmitting in the uplink. The wireless device may adapt a transmission gap before or after an uplink transmission based on a signaled LBT type.

For example, the wireless device may receive an uplink grant comprising an indication of one or more subframes to use for transmitting uplink data; obtain an indication of a LBT type; determine, using the obtained LBT type, at least one of a starting symbol and a stopping symbol for transmitting uplink data; and transmit uplink data according to at least one of the determined starting symbol and the determined stopping symbol.

As another example, the wireless device may receive an uplink grant; receive an indication of a last subframe x that is within a MCOT limit; transmit uplink data in one or more subframes of the uplink grant prior to subframe x based on a short clear CCA procedure; and transmit uplink data in the one or more subframes of the uplink grant after subframe x based on a category 4 LBT procedure.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

In particular embodiments, processing circuitry 1320 in communication with transceiver 1310 performs LBT procedures before transmitting in the uplink. Processing circuitry 1320 in communication with transceiver 1310 adapts a transmission gap before or after an uplink transmission based on a signaled LBT type.

For example, processing circuitry 1320 in communication with transceiver 1310 may receive an uplink grant comprising an indication of one or more subframes to use for transmitting uplink data; obtain an indication of a LBT type; determine, using the obtained LBT type, at least one of a starting symbol and a stopping symbol for transmitting uplink data; and transmit uplink data according to at least one of the determined starting symbol and the determined stopping symbol.

As another example, processing circuitry 1320 in communication with transceiver 1310 may receive an uplink grant; receive an indication of a last subframe x that is within a MCOT limit; transmit uplink data in one or more subframes of the uplink grant prior to subframe x based on a short clear CCA procedure; and transmit uplink data in the one or more subframes of the uplink grant after subframe x based on a category 4 LBT procedure.

Other embodiments of the wireless device may include additional components (beyond those shown in FIG. 13A) responsible for providing certain aspects of the wireless device's functionality, including any of the functionality described above and/or any additional functionality (including any functionality necessary to support the solution described above).

FIG. 13B is a block diagram illustrating example components of a wireless device 110. The components may include receiving module 1350, determining module 1352, and transmitting module 1356.

Receiving module 1350 may perform the receiving functions of wireless device 110. For example, receiving module 1350 may receive uplink scheduling from a network node. In some embodiments, receiving module 1350 may receive configuration information, such as an indication of an LBT type or an MCOT limit, from a network node. Receiving module 1350 may perform the receiving functions described in any of the examples and embodiments described above. In certain embodiments, receiving module 1350 may include or be included in processing circuitry 1320. In particular embodiments, receiving module 1350 may communicate with determining module 1352 and transmitting module 1356.

Determining module 1352 may perform the determining functions of wireless device 110. For example, determining module 1352 may determine a starting or stopping symbol for uplink transmission as described in any of the examples and embodiments above. Determining module 1352 may determine what type of LBT procedure to perform based on the received MCOT limit. In certain embodiments, determining module 1352 may include or be included in processing circuitry 1320. In particular embodiments, determining module 1352 may communicate with receiving module 1350 and transmitting module 1356.

Transmitting module 1356 may perform the transmitting functions of wireless device 110. For example, transmitting module 1356 may transmit uplink subframes to network node 120 according to any of the determined starting symbol, stopping symbol, and/or LBT type. In certain embodiments, transmitting module 1356 may include or be included in processing circuitry 1320. In particular embodiments, transmitting module 1356 may communicate with receiving module 1350 and determining module 1352.

Figure 14B:
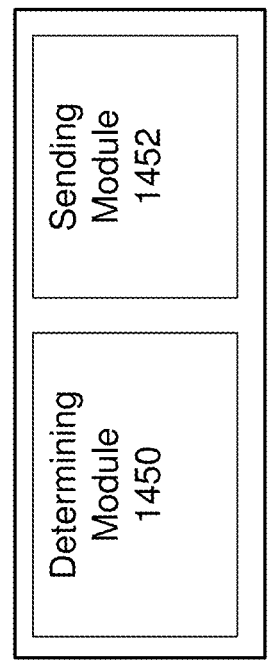
FIG. 14B is a block diagram illustrating example components of a network node.
Figure 14A:
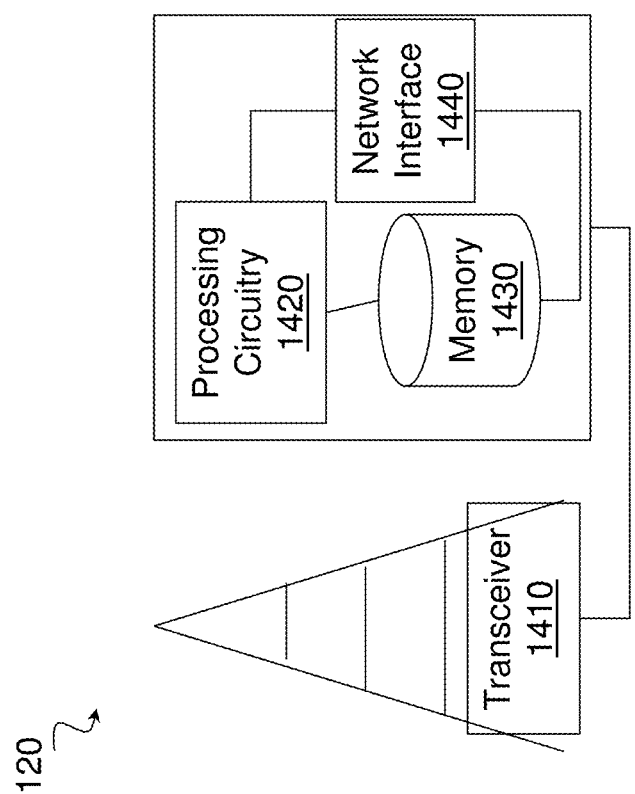
FIG. 14A is a block diagram illustrating an example embodiment of a network node.

FIG. 14A is a block diagram illustrating an example embodiment of a network node. The network node is an example of the network node 120 illustrated in FIG. 8. In particular embodiments, the network node is capable of signaling LBT parameters to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 13A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In particular embodiments, processing circuitry 1420 in communication with transceiver 1410 signals LBT parameters to a wireless device. Other embodiments of network node 120 include additional components (beyond those shown in FIG. 14A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 14B is a block diagram illustrating example components of a network node 120. The components may include determining module 1450 and sending module 1452.

Determining module 1450 may perform the determining functions of network node 120. For example, determining module 1450 may determine a MCOT limit. In certain embodiments, determining module 1450 may include or be included in processing circuitry 1420. In particular embodiments, determining module 1450 may communicate with sending module 1452.

Sending module 1452 may perform the sending functions of network node 120. For example, sending module 1452 may send a MCOT limit or LBT type to wireless device 110. In certain embodiments, sending module 1452 may include or be included in processing circuitry 1420. In particular embodiments, sending module 1452 may communicate with determining module 1450.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
ACK Acknowledgement
BTS Base Transceiver Station
CCA Clear Channel Assessment
CW Contention Window
D2D Device to Device
DCF Distributed Coordination Function
DIFS DCF Inter-Frame Spacing
DL Downlink
eNB eNodeB
FDD Frequency Division Duplex
HARQ Hybrid Automatic Repeat Request
LAA License Assisted Access
LBT Listen-Before-Talk
LTE Long Term Evolution
MAC Medium Access Control
M2M Machine to Machine
MIMO Multi-Input Multi-Output
MRBC Multiple Random Backoff Channels
MTC Machine Type Communication
NAK Negative Acknowledgement
NR New Radio
PDSCH Physical Downlink Shared Channel
PIFS PCF Inter-Frame Spacing
PUCCH Physical Uplink Control Channel
QCI QoS Class Indicator
QoS Quality of Service
RAN Radio Access Network
RAT Radio Access Technology
RB Radio Bearer
RBS Radio Base Station
RNC Radio Network Controller
RRC Radio Resource Control
RRH Remote Radio Head
RRU Remote Radio Unit
SCell Secondary Cell
SRBC Single Random Backoff Channel
SIFS Short Inter-Frame Spacing
TDD Time Division Duplex
UE User Equipment
UL Uplink
UTRAN Universal Terrestrial Radio Access Network
WAN Wireless Access Network

The invention claimed is:

1. A method for use in a user equipment (UE) of transmitting uplink data in unlicensed spectrum, the method comprising:
receiving, from a network node, downlink control information, DCI, comprising an indication of one or more subframes to use for transmitting the uplink data, each subframe comprising a plurality of symbols;
obtaining an indication of a listen-before-talk (LBT) type, the LBT type indicating a type of LBT procedure that the UE should perform before transmitting the uplink data;
determining, using the obtained LBT type, a starting symbol for transmitting the uplink data; and
transmitting the uplink data according to at least one of the determined starting symbol; wherein:
the LBT type indicates an LBT procedure with full random backoff or a short clear channel assessment (CCA) procedure.

2. The method of claim 1, wherein:
the LBT type indicates the LBT procedure with full random backoff; and
the starting symbol comprises a second symbol of the plurality of symbols of a first subframe indicated by the DCI.

3. The method of claim 1, wherein:
the LBT type indicates the short CCA procedure; and
the starting symbol comprises a symbol 25 μs after a first symbol of the plurality of symbols of a first subframe indicated by the DCI.

4. The method of claim 1, wherein obtaining the indication of the LBT type comprises receiving signaling from the network node.

5. The method of claim 1, wherein obtaining the indication of the LBT type comprises obtaining a predetermined LBT type unless the LBT type is signaled from the network node.

6. A user equipment (UE) operable to transmit uplink data in unlicensed spectrum, the UE comprising a memory coupled to processing circuitry, the processing circuitry operable to:
receive, from a network node, downlink control information, DCI, comprising an indication of one or more subframes to use for transmitting the uplink data, each subframe comprising a plurality of symbols;
obtain an indication of a listen-before-talk (LBT) type, the LBT type indicating a type of LBT procedure that the UE should perform before transmitting the uplink data;
determine, using the obtained LBT type, at least one of a starting symbol and a stopping symbol for transmitting the uplink data; and
transmit the uplink data according to at least one of the determined starting symbol and the determined stopping symbol; wherein:
the LBT type indicates an LBT procedure with full random backoff or a short clear channel assessment (CCA) procedure; and the stopping symbol comprises a next to last symbol of the plurality of symbols of a last subframe indicated by the DCI.

7. The UE of claim 6, wherein:
the LBT type indicates the LBT procedure with full random backoff; and
the starting symbol comprises a second symbol of the plurality of symbols of a first subframe indicated by the DCI.

8. The UE of claim 6, wherein:
the LBT type indicates the short CCA procedure; and
the starting symbol comprises a symbol 25 µs after a first symbol of the plurality of symbols of a first subframe indicated by the DCI.

9. The UE of claim 6, wherein the processing circuitry is operable to obtain the indication of the LBT type by receiving signaling from the network node.

10. The UE of claim 6, wherein the processing circuitry is operable to obtain the indication of the LBT type by obtaining a predetermined LBT type unless the LBT type is signaled from the network node.

11. The UE of claim 9, wherein the processing circuitry is operable to receive the signaling from the network node by receiving common signaling over a broadcast channel.

12. The UE of claim 9, wherein the processing circuitry is operable to receive the signaling from the network node by receiving direct signaling over a unicast channel.

* * * * *